April 14, 1925.  
W. SOKOLOF ET AL  
LIQUID LEVEL INDICATOR  
Filed Dec. 12, 1921
1,533,138
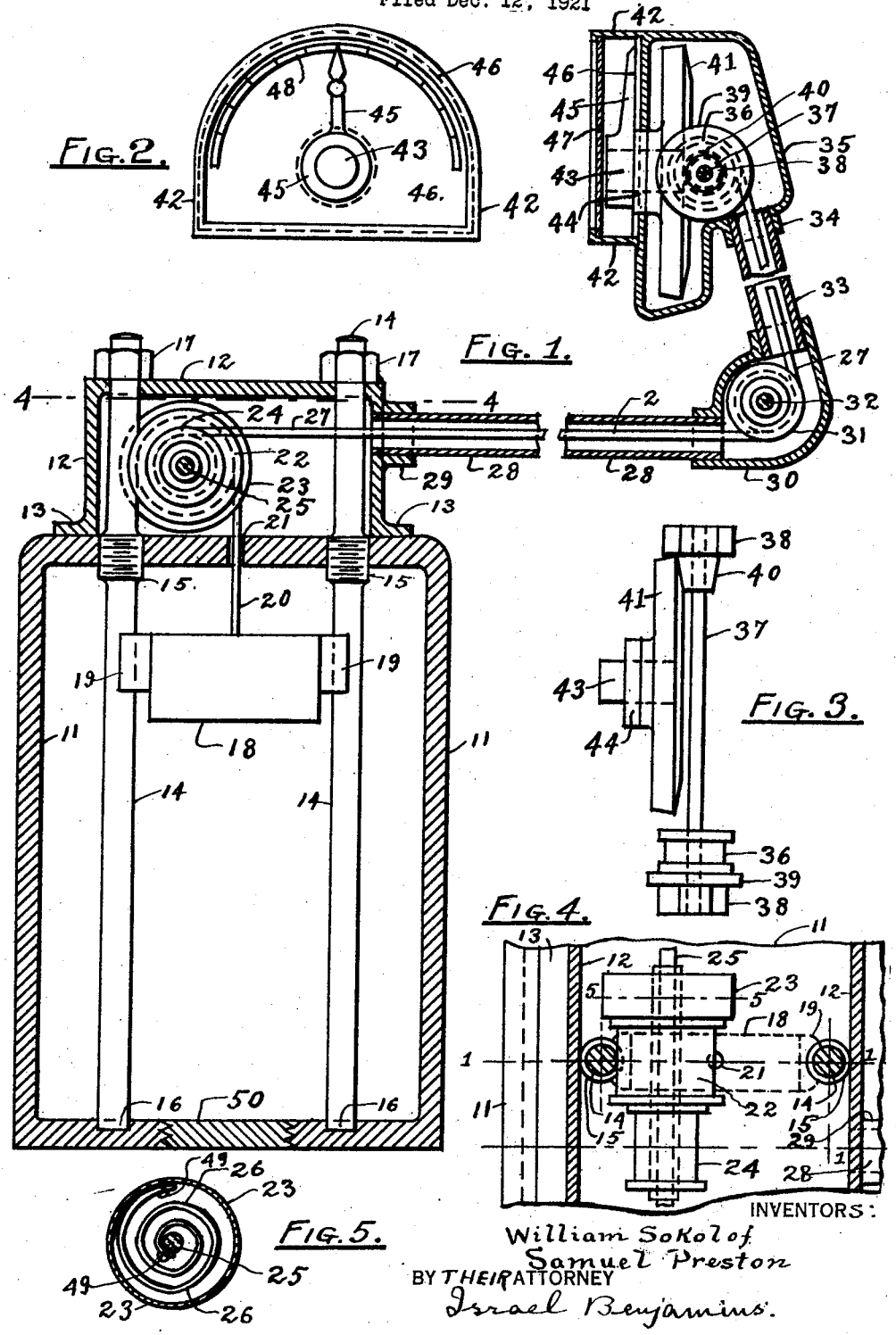
INVENTORS:  
William Sokolof  
Samuel Preston  
BY THEIR ATTORNEY  
Israel Benjamins Patented Apr. 14, 1925.

1,533,138

UNITED STATES PATENT OFFICE.

WILLIAM SOKOLOF AND SAMUEL PRESTON, OF BROOKLYN, NEW YORK.

LIQUID-LEVEL INDICATOR.

Application filed December 12, 1921. Serial No. 521,830.

*To all whom it may concern:*

Be it known that we, WILLIAM SOKOLOF and SAMUEL PRESTON, citizens of the United States, residing at Brooklyn, in the county of Kings and State of New York, have invented a new and useful Liquid-Level Indicator, of which the following is a specification.

Our invention consists in the novel features hereinafter more fully described, and the objects of it are:

First: To enable a gasoline gauge to be placed at the front of an automobile when the gasoline tank is situated at the rear of the automobile;

Second: To have the above gauge accurate to a very high degree; and

Third: To have our indicating mechanism simple, durable and comparatively inexpensive.

We attain these objects by the mechanism, illustrated in the accompanying drawings or by any mechanical equivalent or obvious modification of the same.

In the drawings Fig. 1 is a vertical section on the broken line 1—1 of Fig. 4, the view being partly broken away, and showing the inner parts of the mechanism in elevation;

Fig. 2 is a view of the dial and frame of the gauge, looking from left to right in Fig. 1;

Fig. 3 is a plan or top view of the gauge mechanism which is enclosed in the casing 35, hereinafter described;

Fig. 4 is a fragmentary sectional plan on the line 4—4 of Fig. 1; and Fig. 5 is a vertical section on the line 5—5 of Fig. 4 through the main spring 26 and casing 23 thereof, which are hereinafter more fully described, but showing the spring as consisting of but a few convolutions, for the sake of clearness.

Similar numerals refer to similiar parts throughout the several views:

11 designates the gasoline tank, which has mounted thereon the housing 12, which may be secured to the top of the tank by means of the flanges 13 and suitable fastenings, which are omitted from the drawings.

14—14 are a pair of vertical guide rods, which are shown in Fig. 1 as secured to the tank 11 and housing 12 by having the upset portions 15 threaded and screwed in position in the tapped openings in the top of the tank 11; the lower ends of the rods 14 rest in the notches 16 in the bottom of the tank 11, and the upper ends of the rods 14 pass through the top of the housing 12 and have the nuts 17 secured thereto, the nuts resting against the top of said housing 12.

18 is a float, which may have the slides 19 either made in one therewith or secured thereto, which slides are in engagement with the said rods 14, thereby guiding the float in its motion in a vertical direction.

20 is an inextensible chain or band, which is shown as passing through the opening 21 in the top of the tank 11, and it is connected at its lower end to the said float 19; it has its upper end connected to and wound upon the primary drum 22; the length of said band or chain 20 is sufficient to allow the float 18 to reach the bottom of the tank 11.

The drum 22 is mounted on the shaft or spindle 25, which has also mounted thereon the auxiliary drum 24 which serves as an extension of the primary drums 22, and is shown in Fig. 5 as connected to the inner end of the clock spring 26, the outer end of which is connected to the spring-casing 23, both connections being made by means of the set screws 49. The spring 26 may have a great many more convolutions than as shown in Fig. 5 and is preferably initially strained.

Either the shaft 25 may be kept stationary, while the casing 23 is rotated with the drums 22 and 24, or the casing 23 may be secured in position and the shaft 25 with the drums 22 and 24 rotated; in the latter case the spring would have to be inclined in the opposite direction from that shown in Fig. 5; in each case the spring would resist the rotation, which would be produced by the weight of the float 18 and slides 19; and the force of the spring would be assisted by the buoyancy of the partly immersed float 18; the buoyancy would vary with the amount of gasoline displaced by the float, and this will vary with the degree of immersion of the float, which degree will increase as the float 18 will rise, and it wil gradually diminish during the descent o the float 18; this variation in the degree of immersion of the float 18 will, however, be much reduced through the influence of an auxiliary spring acting in opposition to the main spring 26, as is hereinafter described.

The drums 22 and 24 are secured to each other and, whether connected to the shaft 25 or to the casing 23, will always rotate together and act as one drum.

The auxiliary drum 24 has connected thereto and wound upon it one end of the band or chain 27, which extends through the tube 28 and passes over the guiding drum 31, which is secured to the spindle 32, and it has its other end secured to and wound upon the secondary drum 36, which is shown in Fig. 3 as connected to the spindle 37, which is supported at its ends by the bearings 38, and it has secured thereto the bevel gear 40, which is in mesh with the bevel gear 41. The secondary drum 36 has secured thereto the spring casing 39, which is adapted to enclose the auxiliary spring, which is also preferably initially strained and may be in all respects similar to the main spring 26, only weaker than the latter, and arranged to act in opposition thereto and its action on the secondary drum 36 causes the latter to take up the slack of the band or chain 27, when the latter is unwound from the auxiliary drum 24, and the band or chain 27, when wound upon the auxiliary drum 24, turns said secondary drum 36 against the tension of the auxiliary spring in said casing 39. In either case, the motion of the secondary drum 36 is communicated to the pin 43 by means of the said bevel gears 40—41, which are shown in Fig. 3 by their pitch cones, to which pin 43 the bevel gear 41 is connected, and both are supported in position by the bearing 44, which may be secured to the body of the automobile.

Said secondary drum 36, with the gears 40 and 41, and the spring casing 39 are enclosed by the housing 35, and the pin 43 extends therefrom into the frame 42, and it has connected thereto at its outer end the index 45, which points to the insignia 48 on the dial 46, which is contained in the rear of said frame 42, the front thereof being closed by the glass pane 47.

The insignia 48 on said dial 46 may be numbered to correspond to the volume of gasoline in the tank 11 at different times, and the exact volumes may be determined by experiment.

The force of the said auxiliary spring in the casing 39 acting in opposition to the main spring 26 will modify the balance of forces hereinbefore described making the resultant force of the two springs less variable; in the mechanism as shown by the drawings the weight of the float and slides is arranged to balance the resultant of the forces of both the main spring 26 and the auxiliary spring, which is contained in the casing 39, in addition to the buoyancy of the float which will be less variable as the resultant force of the springs 26 and 39 will be less variable; the size of the float 18 may, therefore, be comparatively small, as the variation of the degree of immersion will be small.

The float 18 may be inserted into the tank 11 through an opening in the top of the latter; but, when there is no opening in the top of the tank, one may be formed in the bottom thereof, and the opening may be kept normally closed by the plug 50, as shown in Fig. 1.

The tank 11 may be situated at the rear of the automobile, and the tube 28 may extend to the front thereof.

The tube 28 is shown in Fig. 1 as broken off and connected at one end thereof to the socket 29 of the housing 12 and at the other end to the housing 30, which encloses the guiding drum 31; the tube 33, which encloses the upper end of the band or chain 27, is connected at its lower end to said housing 30 and at its upper end to the socket 34 of the housing 35.

Instead of a uniform chain or band 27 we propose to employ a chain for each of the parts of the transmitting means, which pass over the drums 24, 31 and 36, and the intermediate parts may consist of rods or wires.

Many changes could be made in the details of our Mechanism for Indicating the Volume of Gasoline in Tanks of Automobiles, without departing from the main scope of our invention; we do not, therefore, restrict ourselves to the details as shown in the drawings; but we intend to include also all mechanical equivalents and reasonably obvious modifications of the same within the scope of our invention.

What we claim as our invention, and desire to secure by Letters Patent, is:—

1. In a mechanism for indicating at the front of an automobile the volume of gasoline in a tank situated at the rear of an automobile a float, a flexible means for suspending the float within the tank, a primary drum for winding said means thereon and, a main spring for actuating said drum situated above the float, an index at the front of the automobile, a secondary drum operatively connected to the index and situated at the front of the automobile, a flexible means for transmitting the motion from the primary drum to the secondary drum during the rising of the float and an auxiliary spring connected to the secondary drum to act in opposition to the main spring and to take up the slack of the transmitting means when the same is unwound during the falling of the float.

2. In a mechanism for indicating the volume of gasoline in a tank of an automobile a float suspended within the tank, vertical guide rods in the tank to keep the float in a vertical path, threaded upset portions on said guide rods to be screwed into tapped openings in the top of the tank, thereby securing said guide rods in position, a flexible means for suspending the float, a drum for winding said means thereon, and a spring for actuating the drum situated above the float, an index and a means for transmitting the motion from the drum to the index.

SAMUEL PRESTON.
WILLIAM SOKOLOF.